United States Patent [19]
Swenson

[11] Patent Number: 5,081,977
[45] Date of Patent: Jan. 21, 1992

[54] LOW POLLUTION NATURAL GAS VEHICLE

[75] Inventor: Paul F. Swenson, Shaker Heights, Ohio

[73] Assignee: Consolidated Natural Gas Service Company, Inc., Pittsburgh, Pa.

[21] Appl. No.: 479,335

[22] Filed: Feb. 13, 1990

[51] Int. Cl.⁵ .............................................. F02B 43/00
[52] U.S. Cl. ................................. 123/527; 123/1 A; 123/563; 123/542
[58] Field of Search ............... 123/527, 563, 567, 525, 123/542, 543, 1 A, 27 GE

[56] References Cited

U.S. PATENT DOCUMENTS

| | | | |
|---|---|---|---|
| 2,602,289 | 7/1952 | Anxionnaz et al. | 123/27 GE |
| 2,767,691 | 10/1956 | Mengelkamp et al. | 123/1 A |
| 3,483,854 | 12/1969 | Foran et al. | 123/563 |
| 4,421,087 | 12/1983 | Schuurman | 123/525 |
| 4,474,162 | 10/1984 | Mason | 123/563 |
| 4,503,832 | 3/1985 | Pefley et al. | 123/27 GE |
| 4,505,249 | 3/1985 | Young | 123/527 |
| 4,688,383 | 8/1987 | Pascual | 123/563 |
| 4,742,801 | 5/1988 | Kelgard | 123/526 |

FOREIGN PATENT DOCUMENTS

| | | | |
|---|---|---|---|
| 2456856 | 1/1981 | France | 123/525 |
| 1-195963 | 8/1989 | Japan | 123/542 |

*Primary Examiner*—E. Rollins Cross
*Attorney, Agent, or Firm*—Pearne, Gordon, McCoy & Granger

[57] ABSTRACT

A method and apparatus for reducing emissions from an internal combustion engine used for propelling a heavy land vehicle, for example, comprising a fuel supply tank for storing liquified natural gas and a fuel circuit for cooling compressed charge air to the engine with the heat of vaporization of the fuel. Under low load conditions fuel vapor from the tank can be consumed to avoid an excessive build-up of pressure; the engine is operated with a lean fuel/air mixture without cooling of the charge air to obtain low emissions. Non-methane hydrocarbon emissions are eliminated by stripping the natural gas of essentially all of the higher hydrocarbons during the liquification process.

7 Claims, 1 Drawing Sheet

LOW POLLUTION NATURAL GAS VEHICLE

BACKGROUND OF THE INVENTION

The invention relates to a method and apparatus for reducing certain emissions from internal combustion engines.

PRIOR ART

It is known that, in general, the tendency of an internal combustion engine to produce and exhaust nitrous oxides (hereinafter $NO_x$) rises with an increase in peak temperature developed in operation of the engine. Conversely, it is known that as the temperature of the charge air to the intake manifold of an engine is lowered there is a decrease in $NO_x$ emissions. It is known, for example, from U.S. Pat. Nos. 3,441,011 and 4,683,725 to cool the intake air to an engine with mechanical refrigeration apparatus to achieve an increase in power. U.S. Pat. No. 4,474,162 illustrates a heat exchanger or intercooler for cooling the charge air from a turbocharger or supercharger with liquid coolant. U.S. Pat. No. 2,602,269 discloses, with a combustion engine on a vehicle, a method of vaporizing and heating a normally gaseous fuel stored in liquid form at low temperatures by heat transfer with the charge air.

SUMMARY OF THE INVENTION

The invention provides a method and apparatus for operating an internal combustion engine on natural gas fuel in a manner whereby both $NO_x$ and non-methane hydrocarbon emissions can be reduced. The invention uses natural gas fuel stored in a liquified cryogenic state and utilizes the latent cooling capacity of this liquid, including its heat of vaporization, to cool the charge air delivered to the engine. The resultant low temperature charge air significantly reduces the peak combustion temperature developed within the engine and thereby achieves a substantial reduction in the formation of $NO_x$ in the combustion process. Preferably, the invention is applied to a turbocharged or supercharged engine system where the compressed charge air is elevated in temperature in the external compression process of the turbocharger or supercharger. Where the charge air leaving the external compressor is cooled by a conventional intercooler to reduce its temperature, it is still at a relatively high temperature of, for example, 150° F.

According to the present invention, this still warm or hot air is further cooled by heat exchange with the cryogenic fuel preferably to a temperature just above the dew point or frost temperature, the latter typically being about 32° F. A dramatic decrease in the production of $NO_x$ is realized as a result of this sub-cooling of the charge air from the intercooler temperature to the near dew point or near frost point temperature. Cooling of the charge air, additionally, allows greater power to be produced by the engine and reduces the tendency of the engine to knock.

In certain applications where an engine operates alternately between full power and low power modes, sub-cooling of the charge air can be performed in the high power mode to reduces $NO_x$ emissions as described above and in the low power mode the charge air can be allowed to enter the engine at the elevated temperature at which it exits the turbocharger or supercharger and be used with an ultra-lean burn fuel/air ratio to also reduce $NO_x$ emissions.

In accordance with a further aspect of the invention, objectionable non-methane hydrocarbon emissions from an internal combustion engine are reduced or eliminated by a process of using natural gas fuel which prior to combustion in the engine is stripped of non-methane hydrocarbons. Suitable stripping processes are well-known in the natural gas industry and are ordinarily used to strip, i.e. remove, non-methane hydrocarbons from natural gas as recovered from a well as necessary to reduce its btu content to a standard that a natural gas utility company meets in distributing its product to its regular customers.

BRIEF DESCRIPTION OF THE DRAWING

The drawing represents a vehicle employing an internal combustion engine prime mover having a fuel control system constructed and operated in accordance with the invention.

DESCRIPTION OF THE PREFERRED EMBODIMENT

Figure 1:
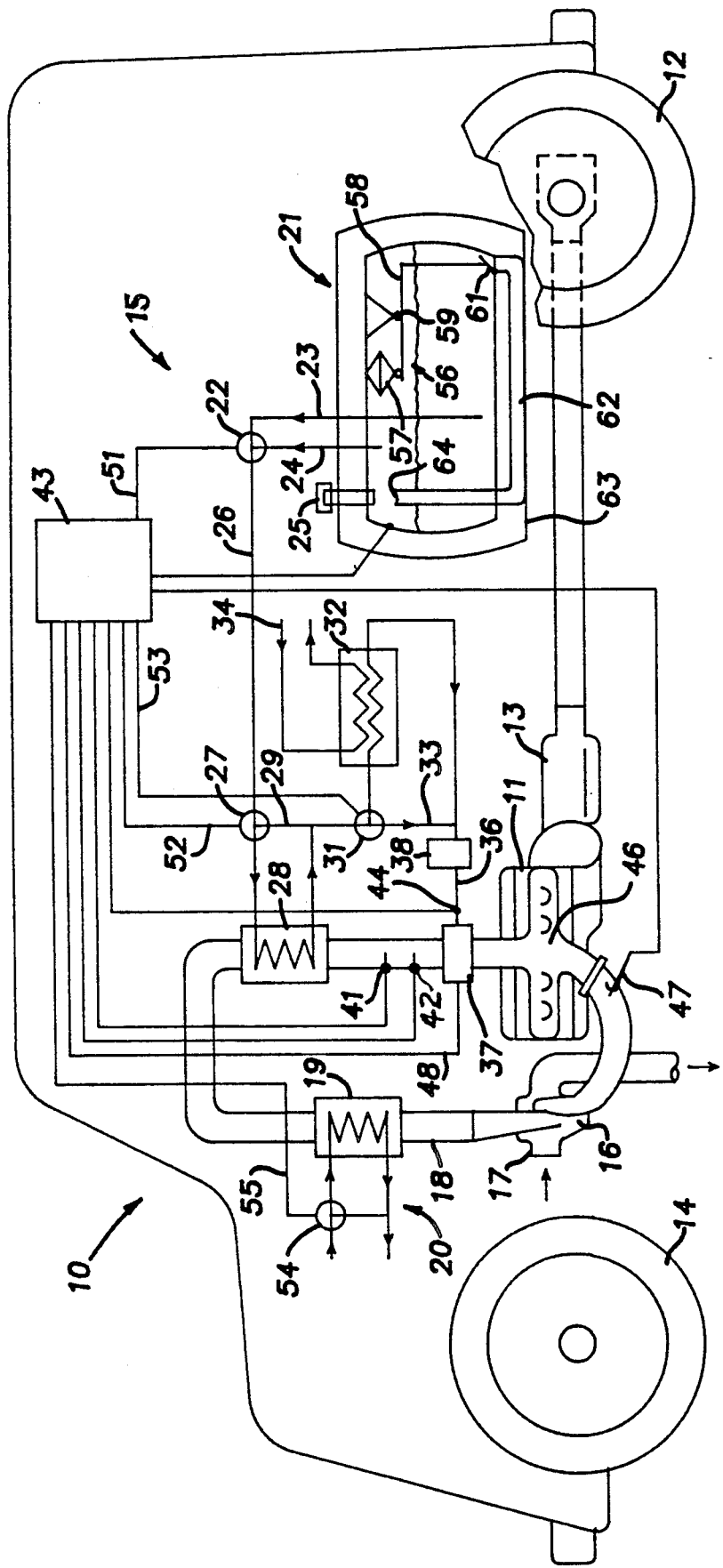

A vehicle diagramatically represented at 10 is, for instance, a heavy-duty land vehicle such as a truck of a gross weight in excess of 14,000 lbs. or a large urban passenger bus. The vehicle 10 includes an internal combustion engine 11, preferably of the spark ignition type, driving a set of propulsion wheels 12 through a drive train 13. A set of front wheels 14 provide for steering of the vehicle in a known manner. The engine 11, in the illustrated example, is fitted with a conventional turbocharger 16. The turbocharger 16 utilizes energy from the exhaust of the engine 11 to compress charge air to be combusted by the engine 11. Charge air is drawn into an inlet 17 of the turbocharger 16 and is compressed to a pressure which when the engine is underload is substantially above atmospheric pressure reaching, for example, 7 psig. Air compressed by the turbocharger 16 is substantially elevated in temperature as a result of the compression process which occurs externally of the engine 11. The charge air after compression in the turbocharger 16 is conducted by a supply conduit 18 to an intercooler 19 which is either of the air cooled type or of the water cooled type, both known in the art. A cooling fluid circuit for the intercooler 19 is shown at 20. The intercooler 19 serves to cool the compressed charge air exiting the turbocharger 16 at a temperature of, for example, about 250° F., to a substantially lowered temperature in the range of about 150° F., for example.

The engine 11 is supplied fuel from a tank 21 carried on the vehicle 10 through a control system 15. The fuel in the tank 21 is liquified natural gas (hereinafter LNG) and natural gas vapor stored at cryogenic temperatures of, for example, −260° F. and at a pressure of, for example, at least 10 psi and usually not more than 75 psi. A port 25 for refilling the tank 21 is provided. The tank 21, fuel lines, and associated componentry carrying the fuel to the engine 11 are cryogenically insulated as needed according to known techniques.

Natural gas fuel from the tank 21 is delivered to a valve 22 in liquid form through a line 23 and in gaseous form through a line 24. From the valve 22 the natural gas is conveyed through a supply line 26 to a control valve 27 that directs it either through a natural gas intercooler 28 or causes it to bypass this intercooler through a line 29. The natural gas intercooler 28 is arranged to allow natural gas flowing through it to absorb heat from the charge air flowing through the supply conduit 18. The natural gas intercooler 28 is downstream of the conventional intercooler 19 with reference to the flow of charge air from the turbocharger 16 to the engine 11. The natural gas intercooler 28 has the general construction of a conventional air-to-air intercooler known in the art.

Natural gas fuel passing through either the intercooler 28 or the bypass line 29 is carried to a control valve 31 that directs it either through a heat exchanger 32 or a line 33 bypassing this heat exchanger. The heat exchanger 32 is supplied a continuous flow of heating fluid such as jacket water or exhaust from the engine 11 through a circuit 34 while the engine is operating to avoid frost build-up within the heat exchanger 32. From the heat exchanger 32 or from the line 33 natural gas is conveyed by a line 36 to a throttle body fuel injector 37 on the intake manifold of the engine 11. A pressure regulator 38 of generally known construction is positioned in the line 36 to limit supply pressure of natural gas to the fuel injector 37 to a desirable level of, for example, 10 psig. The throttle body fuel injector 37 is of generally known construction and mixes charge air received through the supply or delivery line 18 with natural gas in the gaseous state received through the line 36.

The pressure and temperature of the charge air in the line 18 adjacent the fuel injector 37 is monitored by sensors 41, 42 respectively and corresponding electrical signals are conveyed to a load mode controller 43. Additionally, the temperature of the natural gas fuel is monitored by a sensor 44 in the line 36 and a corresponding electrical signal is conveyed to the controller 43. The exhaust gases from the exhaust manifold 46 of the engine 11 are monitored for oxygen by a sensor 47 that sends an electrical signal to the controller 43 enabling the controller to regulate the fuel/air ratio through the fuel injector 37 via a control line 48. The controller 43 is connected to control the positions of the directional control valves 22, 27 and 31 through lines 51-53, respectively. Additionally, the controller operates a directional control valve 54 at the intercooler circuit 20 via a control line 55.

Absorption of heat by LNG in the tank 21 from the atmosphere is unavoidable but with proper construction of the tank occurs at a relatively low rate. For proper operation of the engine, it is important that the pressure within the tank 21 remain above a certain minimum pressure such as 10 psig. This minimum pressure is obtained, when necessary, by control apparatus 56 within the tank 21. The apparatus 56 includes a bellows 57 that expands, upon a decrease in tank pressure, to swing a lever 58 about a fulcrum 59 to open a valve 61 at the bottom of the chamber of the tank 21. The valve 61 allows LNG to enter a line 62 that is in a relatively high level of thermal communication with the atmosphere through an outer shell 63 of the tank 21 as compared to the insulated interior of the tank. LNG passing into this line 62 is vaporized and returned at an opposite end 64 of the line 62. A conventional safety relief valve, not shown, is connected to the interior of the tank 21 to externally discharge natural gas vapor in the event the pressure of the natural gas in the tank reaches a specified level of, for example, 75 psig.

The invention reduces $NO_x$ emissions and the tendency of the engine to knock by using the heat of vaporization of the LNG fuel to cool the charge air to a desired reduced temperature. In a regular mode of operation, with the engine under load, the fuel control valve 22 under the direction of the controller 43 supplies LNG from the line 23 to the intercooler 28 where heat is absorbed from the charge air and the natural gas is simultaneously heated. From the intercooler 28 the charge air passes to the fuel injector 37 and then into the engine for combustion. The intercooler 28 is operated to reduce the temperature of the charge air typically from about 150° F., for example, as it leaves the first intercooler 19 preferably to the dew point or to the frost point of the air depending, for instance, on the engine manufacturers' specifications. When the charge air is lowered to a desired temperature as measured by the sensor 42, the controller 43 modulates the valve 27 so that some or all of the LNG moves through the bypass line 29 to match the engine's fuel requirements while not overcooling the charge air.

The fuel tempering heat exchanger 32 ensures that fuel delivered to the fuel injector 37 is fully vaporized and tempered to a suitable control temperature above the frost point or the dew point, as desired. The controller 43, accordingly, monitors the temperature of fuel at the injector 37 through the sensor 44 and operates the valve 31 to direct as much of the natural gas fuel through the heat exchanger 32 as is necessary to meet the engines current fuel requirements and absorb as much heat into the fuel as is necessary to reach the desired control temperature. Where little or no heat is required to be added to the fuel, the valve 31, under direction of the controller 43, permits the appropriate quantity of fuel to bypass the heat exchanger 32 to ensure that the natural gas fuel is not overheated to a temperature above that desired.

In accordance with a feature of the invention, when the engine 11 is operated under light loads, the engine is run at an ultra-lean fuel/air ratio of about 0.06 of stoichiometric and the charge air is delivered to the engine at a temperature as high as is practical. Operation in this mode reduces $NO_x$ emissions and can beneficially reduce any elevated vapor pressure in the ullage space in the tank 21.

In the low power mode, indicated by a low pressure reading at the air pressure sensor 41, the controller 43 sets the fuel tank valve 22 to a position where only vapor from the ullage space is admitted through the line 24 and sets both valves 54 and 27 to positions where the respective cooling fluid and natural gas bypass the intercoolers 19 and 28. Additionally, the controller 43 modulates the position of the fuel temperature valve 31 to maintain fuel being delivered to the fuel injector at a suitable temperature. During the low power lean burn operational mode, the controller 43 causes the throttle body fuel injector to produce the desired lean fuel/air ratio.

Pressure can build-up in the tank 21 due to the inevitable absorption of heat from the environment over an extended period of time. Reducing tank pressure by consumption of vapor fuel in the low power mode avoids the necessity of allowing excessive pressure to be released to the atmosphere through a relief valve. Where engine operation at low load is required for periods longer than that which can be sustained by the fuel content of the existing vapor in the ullage space, the control apparatus 56 is sized to adequately continuously replenish the supply of vapor. It has been found that $NO_x$ emissions are reduced where ultra-lean fuel/air ratios and relatively high temperature charge air is burned in an internal combustion engine. When the engine is not operating, the controller 43 causes the valve 22 to disconnect the tank 21 from the fuel supply line 26.

In accordance with the another aspect of the invention, unwanted emissions from the engine are additionally eliminated by supplying the natural gas fuel in a stripped condition where non-methane hydrocarbons are completely or substantially completely removed, i.e. to less than 1% by volume. More specifically, the inventive feature involves removing the non-methane hydrocarbons from natural gas in the condition it is recovered from a well. The stripping of non-methane hydrocarbons from raw natural gas is a well-known technique widely used in the industry, although the technique is ordinarily not employed to remove essentially all of the non-methane hydrocarbons but rather to bring the gas of a particular natural source within appropriate btu content for delivery to a utility customer. In accordance with the present invention, once the natural gas is stripped of essentially all of the non-methane hydrocarbons by liquification and distillation, it is supplied to the tank 21.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method of operating an internal combustion engine comprising the steps of supplying liquid natural gas as a fuel for the engine and using the heat of vaporization of the liquid natural gas to cool the charge air supplied to the engine whereby $NO_x$ emissions from the engine are reduced, the charge air being precompressed and then cooled by the liquid natural gas before it enters the engine, said precompressed charge air being passed through a first intercooler and then being cooled in a second intercooler cooled by the liquid natural gas.

2. A method as set forth in claim 1, wherein under low load conditions the cooling steps for the precompressed charge air are omitted and the fuel/air ratio is adjusted to a relatively lean value to reduce $NO_x$ emissions.

3. A method as set forth in claim 1, wherein the liquid natural gas is produced from well gas that has been stripped of substantially all of its non-methane hydrocarbons to reduce non-methane hydrocarbon emissions from the engine.

4. A fuel system for reducing $NO_x$ emissions from an internal combustion engine comprising a source of liquid natural gas fuel at cryogenic temperature and at a moderate pressure, a charge air delivery system, means for cooling the charge air passing through the delivery system with the heat of vaporization of the fuel whereby the maximum temperature developed in the engine is substantially reduced from that which would occur without the use of the cooling capacity of the fuel and the $NO_x$ produced in the combustion of the natural gas is reduced, the delivery system including compressor means for externally precompressing the charge air, an intercooler to reduce the temperature of the precompressed air and a second intercooler downstream of said first intercooler for further cooling the precompressed charge air with cooling by heat exchange with the liquid natural gas fuel.

5. A system as set forth in claim 4, including control means to limit the cooling of the charge air to a temperature not lower than 32° F. to avoid the formation of frost.

6. A relatively large vehicle such as a passenger bus or truck comprising a chassis, an internal combustion engine for propelling the vehicle, a cryogenically insulated fuel tank for containing LNG at cryogenic temperatures and moderate pressures, a fuel line for conducting natural gas from the tank to the engine, a compressor for supplying pressurized charge air for combustion in the engine, conduit means for conducting the pressurized air from the compressor to the engine, heat exchanger means arranged to cool air compressed by the compressor and entering the engine, the heat exchanger means being arranged to transfer heat from the compressed air to the LNG in the fuel line between the tank and the engine, the reduced temperature of the charge air delivered to the engine being effective to reduce the maximum temperature reached in the combustion process within the engine and thereby reducing the $NO_x$ emissions from the engine.

7. A vehicle as set forth in claim 6, including control means responsive to low engine load to discontinue cooling of the precompressed air and to adjust the fuel/air ratio to an ultra-lean condition to reduce $NO_x$ emissions.

* * * * *